Inventor:
Walter Reich
By Mason, Porter, Diller & Brown
ATTORNEYS

March 23, 1971  W. REICH  3,572,367
DEVICE AND PROCESS FOR PURIFYING OR RACKING APPARATUS
FOR LIQUIDS, ESPECIALLY OF TAPPING EQUIPMENT
Filed Aug. 26, 1968  4 Sheets-Sheet 3

Inventor:
Mason Porter, Willer & Brown
ATTORNEYS

United States Patent Office 3,572,367
Patented Mar. 23, 1971

3,572,367
DEVICE AND PROCESS FOR PURIFYING OR RACKING APPARATUS FOR LIQUIDS, ESPECIALLY OF TAPPING EQUIPMENT
Walter Reich, 13 Auf'm Schif,
D 5122 Kohlscheid, Germany
Filed Aug. 26, 1968, Ser. No. 755,358
Claims priority, application Germany, Aug. 26, 1967,
P 16 07 988.2
Int. Cl. F16k *19/00*
U.S. Cl. 137—240        8 Claims

ABSTRACT OF THE DISCLOSURE

There is disclosed a method of purifying and flushing a beverage dispensing tap line involving alternately connecting the line with the beverage source or a purifier and flushing line connection, and when so connected with the last mentioned line controlling it to deliver into the tap line a purifying medium through an aspirating action, or by gas pressure action, followed by a cutting off of purifier introduction and resorting solely to a flushing action. Several embodiments of devices for practicing this method are disclosed.

---

The object of the present invention is a device and a process for purifying of racking apparatus, especially of tapping equipment.

The known racking installations for retailing of particularly non-alcoholic beverages require a regular purification, in order to comply with legal requirements of cleanliness, on the one hand, and, on the other, to guarantee the required quality of the beverages retailed.

As a rule, the racking apparatus is purified by the distributors of the pertinent beverages as a customer service. The individual entrusted with the purification must adhere strictly to voluminous operational instructions. For the purification itself only few certain purifiers are permissible. Furthermore, care must be taken that the purifier does not remain in the pipe lines of the racking installation, so that the quality of taste and compatibility of the liquid to be racked is not jeopardized.

The purification of the tapping installations hitherto had been accomplished as follows: the individual entrusted with purification follows a certain visiting schedule, often covering long distances, to the pertinent innkeeper, and he carries along still strongly concentrated purifiers, dissolved in water, in a 20 liter container. The container, which is fairly heavy, and often has to be carried into the cellar of the inn via poorly accessible ways, will there be connected to the tapping equipment instead of the liquid container. Beside that, a gas cylinder, filled with carbonic acid under pressure, is also connected with the help of which the purifier is forced through the pipes of the tapping equipment. Subsequently the container with purifier is detached from the tapping equipment, the latter is connected to the water supply and is flushed through with water. At the same time, the faucet is disassembled, mechanically cleansed and reassembled. The above described purification process takes from ½ to ¾ hour.

The employment of a person, especially provided for this purpose, is required. At the same time certain factors of uncertainty will result because of varying employee morale and readiness for service, which may affect precise adherence to the purification schedule. Because of the relatively large time interval between two purifications, a correspondingly high concentration of the purifier is necessary. Beyond that, the present kind of purification also involves considerable physical labor, since always two containers of about 20 kg. flushing liquid must be carried about. The container itself represents a value of $28.00 or more. Accidents during carrying and resulting losses are not infrequent due to provision of inadequate safety devices on the access ways such as the stairs.

Therefore, the present invention has for its purpose the provision of a process and a device through employment of which purification of the tapping equipment can be carried out easily, quickly and safely.

According to the invention, the novel equipment includes a body, a channel through the body and which can be connected with a tap pipe leading to a dispensing faucet and which also can be connected to a water supply, a second channel having therein a non-return valve and emptying into said first channel; said second channel being subject to attachment to a conduit coming from a purifier container to deliver the purifier into said first channel.

At the same time it is advantageous to provide that the body be arranged in a mounting, which serves simultaneously as a carrier for the supply of purifier.

The process according to the invention is characterized in that a water supply, as well as a container, filled with purifier, are connected to the tap pipe, the contents of said container being sucked away during passage of the water, and in that subsequently water alone is flushed through to the exclusion of the purifier.

According to one embodiment of the invention, provision has been made at the same time that the flushing agent will be introduced additionally with gas pressure into the mixing unit. The object of the invention makes it possible to use, instead of the heavy containers with a flushing agent mixture, considerably lighter ones developed as one-way packages, with concentrated flushing agent. The mixing is accomplished through the injector-like connection of the flushing agent to the water supply. The purification can be accomplished by the travelling salesman, who must call on the innkeeper anyway at fairly short intervals to sell a new supply. As a result, a separate employee for the purification job is unnecessary. Consumption of purifying agent for purification will be about 100 cc., which is also less than in presently known processes.

Because of the low weight of the flushing agent containers and because of their simple connection possibilities, accidents will be avoided. Not only will a considerable monetary saving in purification result, but also a considerable saving in time. The purification process takes about ¼ of an hour, whereby one also will be able to operate with a relatively low concentration of the flushing agent, because of the regular and shorter time intervals between purifications. The use of carbonic acid as a pressure agent is not absolutely required.

With the above and other objects in view that will hereinafter appear, the nature of the invention will be more clearly understood by reference to the following detailed description, the appended claims and the several views illustrated in the accompanying drawing.

Figure 1:
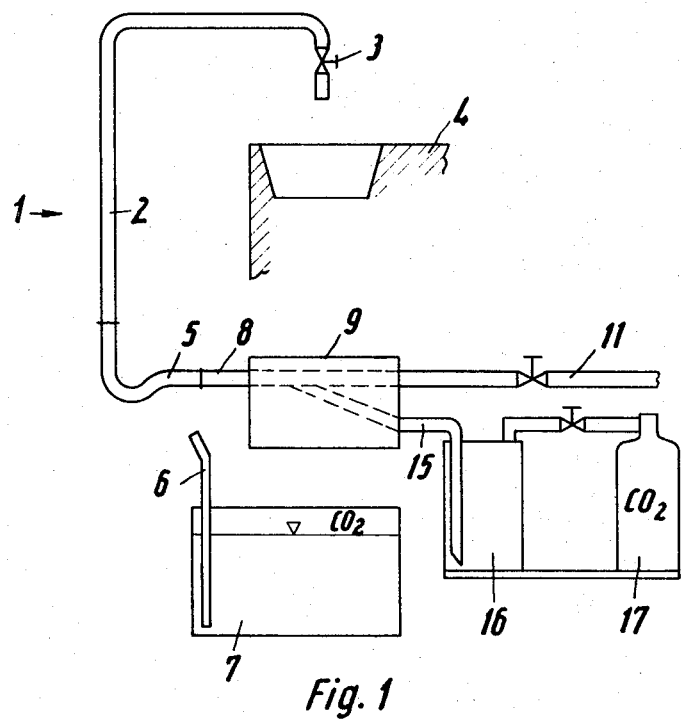
FIG. 1 shows a schematic arrangement of the tools cooperating in the purification procedure.

According to the drawings, the tapping installation 1 consists essentially of a tap pipe 2, one of whose ends carries the faucet 3 above the bar table 4, and the other end 5 of which can be connected to the suction pipe 6 of the beverage container 7. The beverage in the container 7 is under pressure effect of carbonic acid gas.

The end 5 of the tap pipe 2 can also be connected to a sleeve 8 of a purification device 9. The latter consists of a body, through which there leads a channel 10, one end of which empties at the sleeve 8, and the other end of which can be attached to a water supply 11. Into the channel 10 there empties, like an injector, an additional channel 12, which is connected with a suction pipe 15, via a non-return valve 13 and a closing valve 14; said suction line dipping into a flushing agent tank 16, holding about 1 liter of concentrated flushing liquid. This flushing tank or carbonator 16 may be connected, if need be, to a pressure source 17 of carbonic acid. Advantageously, the tank 16 may be held in a container (not shown).

Figure 2:
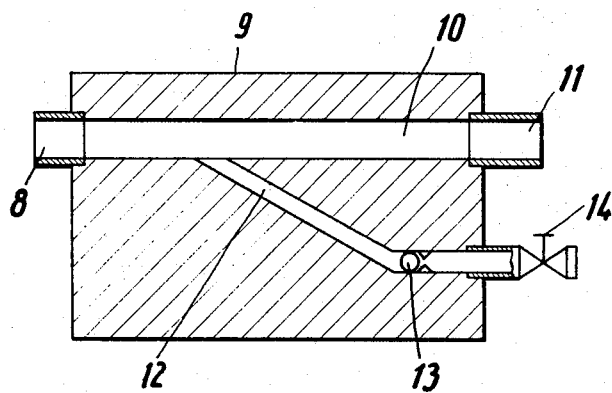
FIG. 2 is a longitudinal section through the purification device of the invention.

The purification of the tapping installation 1 takes place as follows: the preferably resilient end 5 of the tap pipe is coupled with the sleeve 8. Simultaneously the container 16 for the flushing agent is connected to the channel 12. Then the water supply 11 is opened for about 10 minutes. At the same time, the water flowing through the mixing unit will carry along the required quantity of flushing agent in the body 9 from channel 12, if need be with the cooperation of carbonic acid pressure from 17 and will cleanse the tap pipe 2. Subsequently, the connection between channel 12 and container 16 for the flushing agent is closed by means of the closing valve 14 (FIG. 2) and for about 5 minutes water only will flow through the tap pipe. In this way it will be assured that portions of residual flushing agent will be reduced in the installation to such an extent, that they will not harm the beverage. Then the end 5 of the tap pipe will be removed from its connection at 8 and will be connected at 6 with the beverage container 7. After about 2–3 glasses of the beverage have been drawn, the installation will be ready for normal operation.

A three-way valve can also possibly be used for the switching over of the end 5 of the tap pipe between 8 and 6.

It is also possible to connect all valves to a program device, so that the cooperation and any possible error of an operator will be completely avoided.

Figure 3:
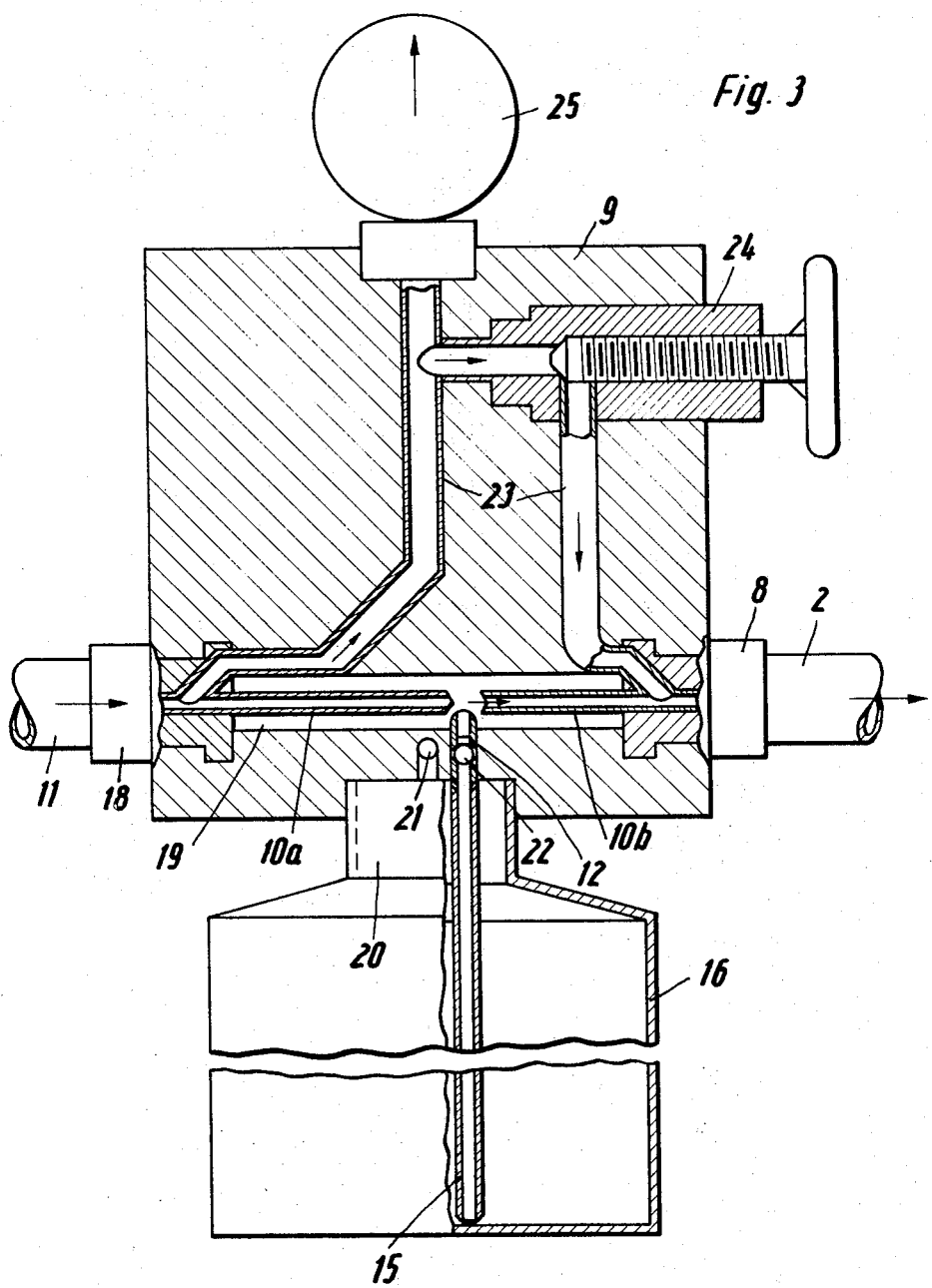
FIG. 3 is a longitudinal section through an embodiment according to the invention.

FIG. 3 shows an actual embodiment according to the invention. In this illustration the same reference numerals have been used for parts which are of the same kind as in FIGS. 1 and 2.

In a body 9, preferably made of colored or transparently plastic, sleeves 8, 18 have been inserted, opposing each other in axial alignment, said sleeves being connected with one another by a channel 19. A thin pipe 10a, starting out from sleeve 18 and which is axially aligned with another pipe 10b, ending at a short distance in front of the former and held in the sleeve 8, projects to about the middle of said channel 19. The pipe 10a forms, so to speak, a nozzle whose jet is introduced into a pipe 10b.

The body 9 is screwed or otherwise secured on a container 16 for the purifier, whose neck 20 has been provided with a ventilating opening 21. A suction pipe 15 projects into the container for the purifier, whose upper end connects with a channel 12, which protrudes up to the area between the spaced opposing ends of the pipes 10a and 10b. The considerable speed of the water, guided through these pipes 10a and 10b, brings about an injector-like driving and drawing off of the flushing liquid from the suction pipe 15. For practical reasons, the channel 12 will have non-return valve 22.

Another by-pass pipe 23, likewise fed by the water supply 11, leads from the sleeve 18 to a closable cock 24 arranged in the upper part of body 9, as well as to a pressure gauge 25. The pipe 23 continues, starting out from the cock 24, and empties into the sleeve 8 and tap pipe 2. The cross section of the by-pass pipe 23 is larger than that of pipes 10a and 10b.

During flushing, the cock 24 is closed as shown in FIG. 3. During passage of the water through pipes 10a, 10b, a corresponding quantity of purifier from 16 is carried along. The reflushing with pure water takes place through opening of the cock 24. At the same time, the water pressure decreases in pipes 10a, 10b to such an extent that no purifier will be sucked off. Rather, the non-return valve 22 is caused to close the suction pipe 15. The reflushing can be accomplished in a short time with a considerable quantity of water and at high pressure. The device is very handy and can be attached without much trouble to a one-way flushing agent container 16.

Figure 4:
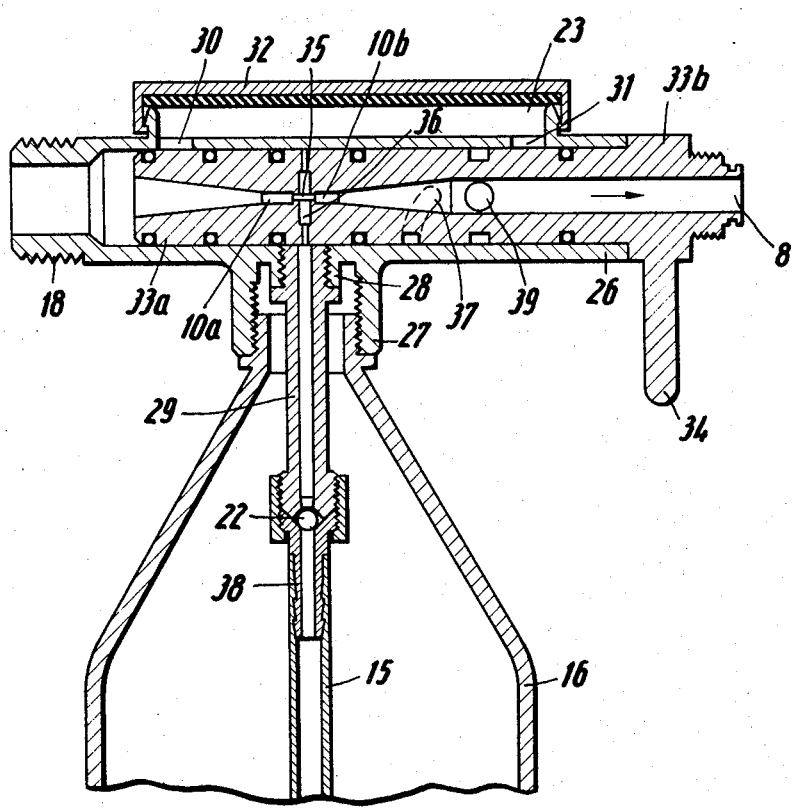
FIG. 4 is a longitudinal section through another embodiment according to the invention in the flushing position.
Figure 5:
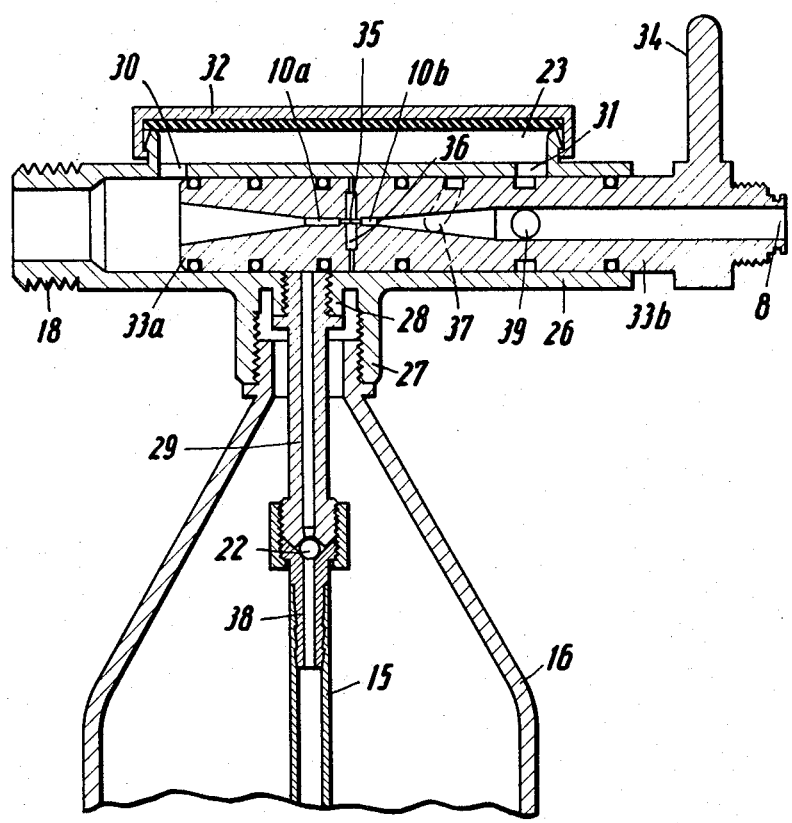
FIG. 5 is a longitudinal section through the device according to FIG. 4 in position for flushing with water.

FIGS. 4 and 5 show another form of device embodying the invention. It consists of an essentially pipelike housing 26, with threaded sleeves 27, 28 arranged concentrically and about centrally, obliquely to its longitudinal axis for the connection of a container 16, filled with flushing agent, on the one hand, and of a small dosing pipe 29, introduced in said housing and connected with a suction pipe 15, which has been equipped with a non-return valve 22.

The housing 26 has two fairly large recesses or bores 30, 31 arranged at an axial distance from one another, at its upper part as well as a cover plate 32, which is tightly connectable with the housing, arranged at a radial distance from the outside periphery of the housing, and which together with the housing forms a by-pass channel 23.

A bipartite, approximately cylindrical valve body 33a, 33b has been arranged for rotatable and longitudinal movement within the housing 26, and when in its left-hand position shown in FIG. 4 its part 33a on the water connection side closes the recess 30 and extends to the lead aperture of the threaded sleeve 28, and whose part 33b projects at a distance from part 33a but is connected releasably with the latter, from the through-flow opening of the threaded sleeve 28 to outside of the housing 26 and there carries a handle 34.

Valve body 33a has a continuous axial bore 10a, tapering off nozzle-like in its cross section from its left toward the right end, as well as a small central exit pipe 35, arranged at its right end, which projects into a bore 10b of this part, extending axially from the left to the right end of part 33b. A disk-like chamber 36 is formed between parts 33a and 33b.

Part 33b is guided in the housing 26 in a coarse thread 37, and can be shifted axially together with part 33a through rotary or twisting movement of the handle 34 around the longitudinal axis of the valve body.

In the position shown in FIG. 4, the valve body assumes its left-hand position, whereby the by-pass channel 23 is closed. The chamber 36 is above the sleeve 28. If now the sleeve 18 of the housing 26 is connected to the water supply and the sleeve 8 to the beverage pipe that is to be purified, the pure water will flow at a high pressure through the bores or channels 10a, 10b into the beverage pipe. At the same time, a vacuum will develop in chamber 36, which brings about a sucking in of the flushing agent in the container 16. The ratio of admixture of flushing agent to water can be adjusted by means of a small sleeve pipe 38, which can be screwed, more or less deeply, on the lower end of the small dosing pipe 29.

If valve body 33a, 33b is shifted to the right into the position shown in FIG. 5, through twisting of handle 34, then it will, on the one hand, close the flow-through opening of sleeve 28 for the purifier and, on the other hand, it will open the by-pass channel 23. At the same time a cross bore 39, leading to channel 10b and provided in part 33b, will connect with recess or bore 31, so that the fed-in water can flow into the beverage pipe alone and in large quantity.

The device can be installed fixedly and facilitates the hitherto cumbersome purification work. The exchange of the purifier container is possible without large expenditure of labor within the shortest time.

I claim:

1. A device for the purification of racking apparatus for liquids comprising a body having a first channel therein, said first channel having opposite end portions, means for connecting one of said opposite end portions to a water supply, means for connecting the other of said opposite end portions to a tap pipe leading to a faucet, a second channel, means between said second channel and the opposite end portions of said first channel responsive to liquid flow through the latter for establishing suction forces in said second channel, means for connecting said second channel with a purifier source, nonreturnable valve means in said second channel between said suction establishing means and said last-mentioned connecting means for permitting the flow of the purifier into said second channel under the influence of the suction forces and preventing the return flow of the purifier past said nonreturnable valve means upon the deactivation of said suction establishing means, by-pass passage means connected in parallel with said first channel, and the cross-section of said by-pass passage means is greater than the cross-section of said second channel.

2. The device as claimed in claim 1, including valve means for controlling the flow of fluid through said by-pass passage means.

3. A device for the purification of racking apparatus for liquids, especially of tapping equipment and including a body having a first channel therein, means for connecting said channel to a water supply, means for connecting said channel with a tap pipe leading to a faucet, a second channel opening into the first channel and having a nonreturn valve therein, means connecting said second channel with a purifier source, a by-pass passage connected in parallel with the first channel, the water supply connection and the tap pipe, valve means for controlling the by-pass passage, and the cross section of the by-pass passage being greater than that of the second channel.

4. The device as defined in claim 3, wherein the body forms a mixing unit and is arranged in a holder which serves simultaneously as a carrier for the supply of purifier.

5. The device as defined in claim 3, wherein the purifier source comprises a one-way flow package.

6. The device as defined in claim 3, wherein the body includes a bore and the first channel is provided in a member longitudinally movable in the bore, means for opening the by-pass passage and closing off the purifier source connection when the member is in one position and for opening the purifier source connection and closing the by-pass passage when the member is in another position.

7. The device as defined in claim 6, wherein the purifier source comprises a one-way flow package.

8. A method of purifying a racking system which includes a tap pipe normally connected to a beverage source and a water pipe normally disconnected with the tap pipe by utilizing an aspirator mechanism having a first channel and a second channel opening between opposite ends of the first channel and defining thereat a suction area upon the flow of water through said first channel comprising the steps of disconnecting said tap pipe from said beverage source and connecting said tap pipe to one end of said first channel, connecting said other end of said first channel to said water pipe, connecting said second channel remote from said suction area to a purifier source, initiating the flow of water through said first channel and said tap pipe whereupon suction is developed at said suction area drawing purifier from said purifier source through said second channel into said first channel and through said tap pipe, subsequently terminating the flow of purifier from said second channel to said first channel and thereafter continuing the flow of only water through said first channel and said tap pipe to purge the latter of the purifier.

References Cited

UNITED STATES PATENTS

| | | | |
|---|---|---|---|
| 572,724 | 12/1896 | Rumely | 137—240X |
| 2,227,646 | 1/1941 | Hillmann | 222—148X |
| 2,477,222 | 7/1949 | Warcup | 137—238 |
| 2,563,385 | 8/1951 | Warcup | 137—238 |
| 2,619,119 | 11/1952 | Warcup | 137—240X |
| 3,084,634 | 4/1963 | McDougall | 137—604X |

STANLEY H. TOLLBERG, Primary Examiner

D. A. SCHERBEL, Assistant Examiner

U.S. Cl. X.R.

222—148